United States Patent
Wern et al.

(10) Patent No.: US 11,592,346 B2
(45) Date of Patent: Feb. 28, 2023

(54) MULTI-RANGE LOAD CELL

(71) Applicant: Weatherford Technology Holdings, LLC, Houston, TX (US)

(72) Inventors: Frank Wern, Hannover (DE); Christina Karin Hebebrand, Hannover (DE)

(73) Assignee: Weatherford Technology Holdings, LLC, Houston, TX (US)

( * ) Notice: Subject to any disclaimer, the term of this patent is extended or adjusted under 35 U.S.C. 154(b) by 292 days.

(21) Appl. No.: 16/802,208

(22) Filed: Feb. 26, 2020

(65) Prior Publication Data

US 2021/0262881 A1    Aug. 26, 2021

(51) Int. Cl.
| G01L 5/00 | (2006.01) |
| G01L 5/24 | (2006.01) |
| E21B 19/16 | (2006.01) |
| G01L 25/00 | (2006.01) |

(52) U.S. Cl.
CPC .............. *G01L 5/24* (2013.01); *E21B 19/166* (2013.01); *G01L 25/003* (2013.01)

(58) Field of Classification Search
CPC ........ G01L 5/24; G01L 25/003; E21B 19/166
See application file for complete search history.

(56) References Cited

U.S. PATENT DOCUMENTS

| 4,649,777 | A |  | 3/1987 | Buck |
| 4,738,145 | A |  | 4/1988 | Vincent et al. |
| 4,842,085 | A | * | 6/1989 | Lang ................... G01G 23/3707 177/164 |
| 4,864,521 | A | * | 9/1989 | Feinland .............. G01G 19/005 177/25.15 |
| RE33,526 | E |  | 1/1991 | Coyle, Sr. |
| RE34,063 | E |  | 9/1992 | Vincent et al. |
| 5,245,265 | A |  | 9/1993 | Clay |
| 5,245,877 | A |  | 9/1993 | Ruark |
| 5,542,318 | A |  | 8/1996 | Wesch, Jr. |
| 5,798,487 | A | * | 8/1998 | Goichman ............. G01G 13/22 177/83 |
| 5,845,549 | A |  | 12/1998 | Bouligny |
| 6,082,224 | A |  | 7/2000 | McDaniels et al. |
| 6,212,763 | B1 |  | 4/2001 | Newman |
| 6,263,763 | B1 |  | 7/2001 | Feigel, Jr. et al. |
| 6,546,806 | B1 | * | 4/2003 | Varma ....................... G01L 1/22 73/766 |
| 7,188,547 | B1 |  | 3/2007 | West et al. |
| 8,726,743 | B2 |  | 5/2014 | Ruehmann et al. |
| 9,488,017 | B2 |  | 11/2016 | Angelle et al. |
| 9,657,539 | B2 |  | 5/2017 | Gupta et al. |
| 10,337,264 | B2 |  | 7/2019 | Rothe et al. |
| 10,436,658 | B2 | * | 10/2019 | Ruehmann ............ E21B 19/166 |
| 10,465,458 | B2 |  | 11/2019 | Ruehmann et al. |
| 10,605,016 | B2 |  | 3/2020 | Thiemann |

(Continued)

FOREIGN PATENT DOCUMENTS

| DE | 10 2014 210 860 A1 | 12/2015 |
| WO | 2004079148 A2 | 9/2004 |

(Continued)

*Primary Examiner* — Max H Noori
(74) *Attorney, Agent, or Firm* — Smith IP Services, P.C.

(57) ABSTRACT

Aspects of the present disclosure relate to a multiple range load cell capable of automatically switching measuring range and method for operating the multiple range load cell.

20 Claims, 5 Drawing Sheets

(56) References Cited

U.S. PATENT DOCUMENTS

| | | |
|---|---|---|
| 2004/0144547 A1 | 7/2004 | Koithan et al. |
| 2004/0195555 A1 | 10/2004 | Bangert et al. |
| 2007/0107912 A1 | 5/2007 | Boutwell et al. |
| 2009/0266539 A1 | 10/2009 | Ruark et al. |
| 2010/0007327 A1* | 1/2010 | Andoh ............. G01R 31/31924 324/76.11 |
| 2010/0132180 A1 | 6/2010 | Conquergood et al. |
| 2011/0030512 A1 | 2/2011 | Begnaud, Jr. |
| 2012/0323500 A1 | 12/2012 | Prefontaine |
| 2012/0330552 A1 | 12/2012 | Conquergood et al. |
| 2015/0101826 A1 | 4/2015 | Gupta et al. |
| 2016/0089083 A1* | 3/2016 | Sutton .................. A61B 5/7455 600/587 |
| 2017/0211344 A1 | 7/2017 | Aalderink et al. |
| 2018/0120183 A1* | 5/2018 | Ruehmann ............ E21B 19/165 |
| 2018/0171729 A1 | 6/2018 | Wood |
| 2019/0202525 A1* | 7/2019 | Shahana ................. B62M 6/45 |
| 2019/0308512 A1* | 10/2019 | Hasumi .................... B62M 6/50 |
| 2022/0113206 A1* | 4/2022 | Chen ...................... A61B 5/389 |

FOREIGN PATENT DOCUMENTS

| | | |
|---|---|---|
| WO | 2005/045177 A1 | 5/2005 |
| WO | 2016191067 A1 | 12/2016 |
| WO | 2017031441 A1 | 2/2017 |

\* cited by examiner

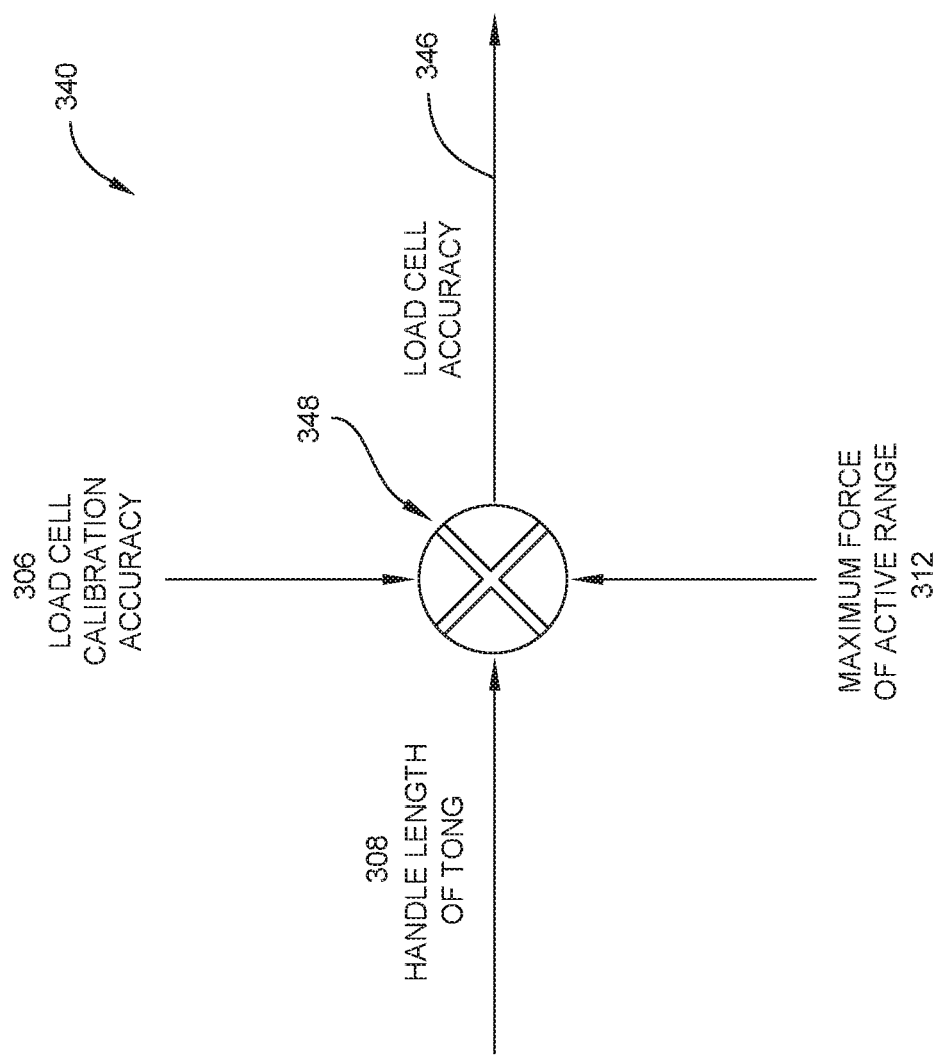

MULTI-RANGE LOAD CELL

BACKGROUND OF THE DISCLOSURE

Field of the Disclosure

The present disclosure generally relates to load cells with multiple ranges and methods for operating the multiple range load cells.

Description of the Related Art

Load cells are used in various operations in oil and gas fields, such as tubular make up operation. When making up a threaded connection, the torque measurement of the threaded connection needs to fulfill specific requirements to ensure the quality of the threaded connection. Typically, the measured torque has to be within a given minimum accuracy. The minimum accuracy may be a value provided by manufacturer of a particular tubular. The accuracy of a torque measurement relates to the maximum range of the used load cell, the calibration accuracy of the load cell, and other parameters of the makeup tool. To stay within the accuracy requirements, load cells with a lower range is typically used for a smaller target torque while load cells with a higher range is used for higher target torque.

During operation, target torques may vary for different joints, different tubulars, or other variations of operating parameters. When the target torque cannot be measured by the installed load cell due to the lower range of the installed load cell, a different load cell is installed. A different load cell is also required when the accuracy requirement cannot be achieved using the installed load cell. Switching load cells during an operation lowers the efficiency and sometimes introduces human errors.

SUMMARY OF THE DISCLOSURE

The present disclosure generally relates multi-range load cells which may be used to ensure minimum accuracy in a wide range of target torque.

In one embodiment, a load cell assembly includes a load cell body configured to perform measurement in two or more ranges; and a controller connected to the load cell body for data communication, wherein the controller is configured to acquire information of an active range of the load cell body, and send command to the load cell body to switch the active range to another range of the two or more ranges.

In another embodiment, a method includes measuring a torque using a multiple range load cell including a controller connected to a load cell body having multiple ranges, wherein the multiple range load cell is configured to measure the torque in an active range; receiving a change in a target torque; and switching the active range to another range of the multiple ranges of the load cell body upon receiving the change in the target torque using the controller.

In another embodiment, a tubular make up tool includes a tong assembly; a load cell body attached to the tong assembly and configured to measure torque applied by the tong assembly in a selected range of two or more ranges; and a controller connected to the load cell body for data communication, wherein the controller is configured to acquire information of the selected range of the load cell body, and send command to the load cell body to selected another range of the two more ranges.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2B is a load cell accuracy calculator according to one embodiment of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Techniques and apparatus are provided herein for a multiple range load cell capable of automatically switching active ranges according to a target torque of the operation. The multiple range load cells reduce the need for manual input from the operator/technician during tubular makeup, and errors in torque measurement, thereby leading to improved and more efficient evaluations of connections.

Figure 1:
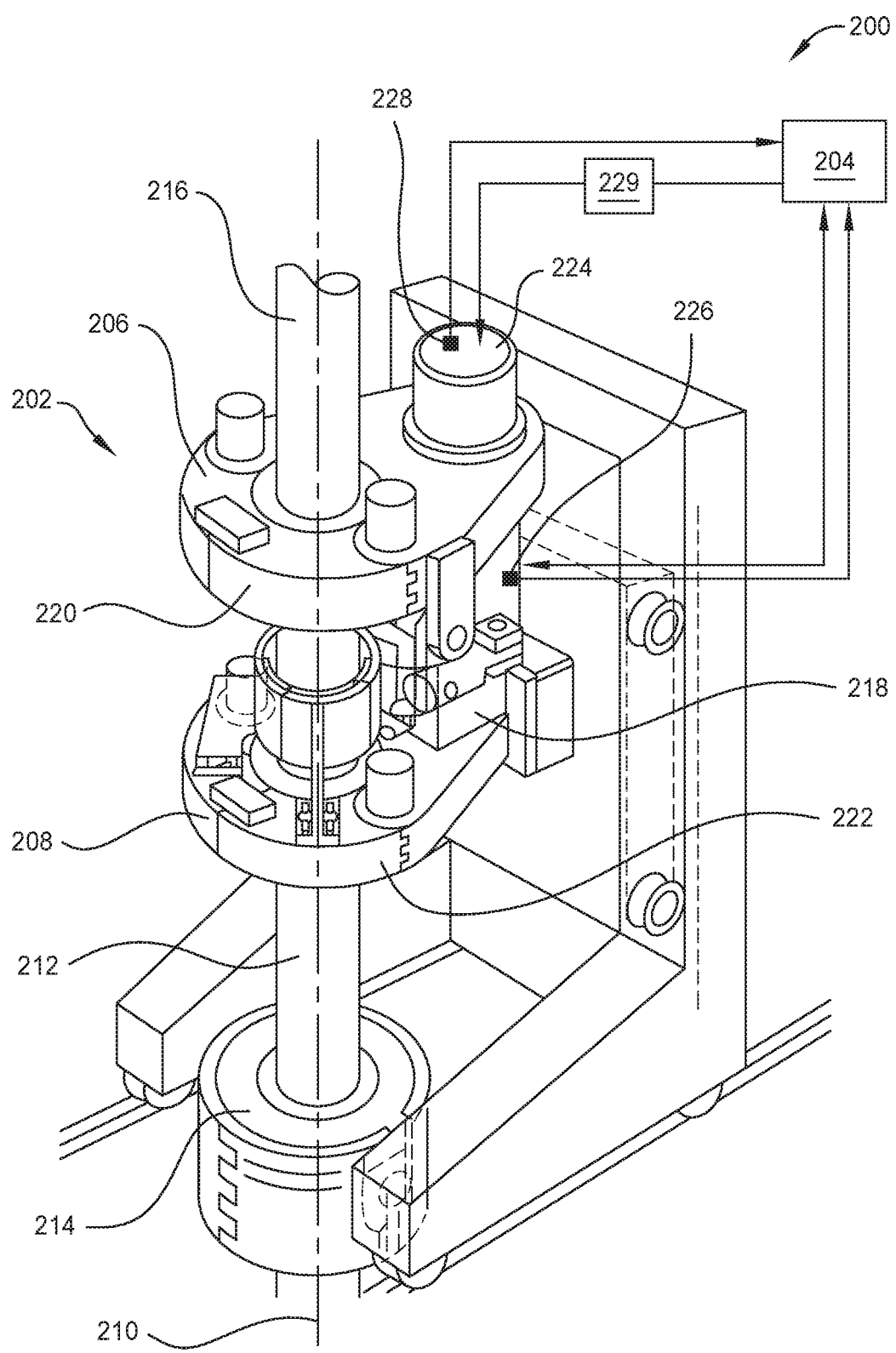
FIG. 1 is a schematic perspective view of a tong assembly including a multiple range load cell according to embodiments of the present disclosure.

FIG. 1 is a schematic perspective view of a tubular makeup system 200 according to one embodiment of the present disclosure. The tubular makeup system 200 may include a tong assembly 202 and a controller 204 for controlling the tong assembly 202. The tong assembly 202 may include a power tong 206 and a backup gripper 208. During operation, the tong assembly 202 may be placed on a drilling rig coaxially with a central axis 210 of a workstring 212. The tong assembly 202 may be disposed above a slip 214 on the drilling rig to add a tubular 216 to the workstring 212 or to remove the tubular 216 from the workstring 212 while the workstring 212 rests on the slip 214.

The power tong 206 and the backup gripper 208 may be coupled together by a frame 218. In one embodiment, the power tong 206 may include a side door 220 which may open to receive or release a tubular and close to clamp the tubular in the power tong 206. Similarly, the backup gripper 208 may include a side door 222 which may open to receive or release a tubular and close to clamp the tubular in the backup gripper 208. The power tong 208 may include a drive unit 224 configured to rotate the tubular clamped in the power tong 208. The drive unit 224 may include a drive motor and a gear assembly.

During operation, the power tong 206 receives and clamps to a first tubular, such as the tubular 216, while the backup gripper 208 receives and clamps to a second tubular, such as a top portion of the workstring 212. The power tong 206 rotates the first tubular while the backup gripper 208 holds the second tubular still causing relative rotation between the first tubular and second tubular, thus, making up a connection between the first and second tubulars or breaking up the connection between the first and second tubulars.

The controller 204 may be connected to the drive unit 224. The controller 204 may send commands to control rotational speed of the power tong 206. The controller 204 may also monitor turns of the power tong 206. In one embodiment, the drive unit 224 may include a turns counter 228. The turns counter 228 may be connected to the controller 204 to monitor the rotation of the power tong 206.

In some embodiments, the tong assembly 202 may include one or more load cells 226 positioned to measure the torque applied to the tubulars being clamped in the tong assembly 202. In one embodiment, the load cell 226 may be disposed in a torque load path between the power tong 206 and the backup gripper 208.

According to some embodiments of the present disclosure, the load cell 226 is configured to operate in two or more different ranges. In some embodiments, the load cell 226 may include two or more sensing units, each sensing unit with a different range of measurement. One of the two or more sensing units may be activated and used for measurement at any given time. In some embodiments, the load cell 226 includes a load cell controller configured to select and activate the sensing units during operation. The load cell controller may automatically select a sensing unit suitable for the operation. In some embodiments, the load cell controller may determine and select a sensing unit with a suitable range according to one or more operating parameters, such as target torque, torque accuracy requirement, structure information of the tong assembly. In some embodiment, the load cell controller automatically switches active sensing unit in response to changes in operating parameters to ensure operation quality, such as maintain required torque measurement accuracy.

In one embodiment, the controller 204 may be connected to the load cell 226. The controller 204 may use the measurements from the load cell 226 to monitor the torque applied between the tubulars in the tong assembly 202. In one embodiment, the controller 204 may include a control program, which when operated, generates commands to control rotational speed of the power tong 206 according to the measured torque applied between the tubulars in the tong assembly 202.

In some embodiments, the controller 204 may receive operating parameters, such as target torque, torque accuracy requirement, structure information of the tong assembly, and instruct the load cell 226 to activate a sensing unit according to the operating parameters. In some embodiments, the load cell 226 activates a suitable sensing unit based on a required minimum torque accuracy determined from the operating parameters.

Figure 2A:
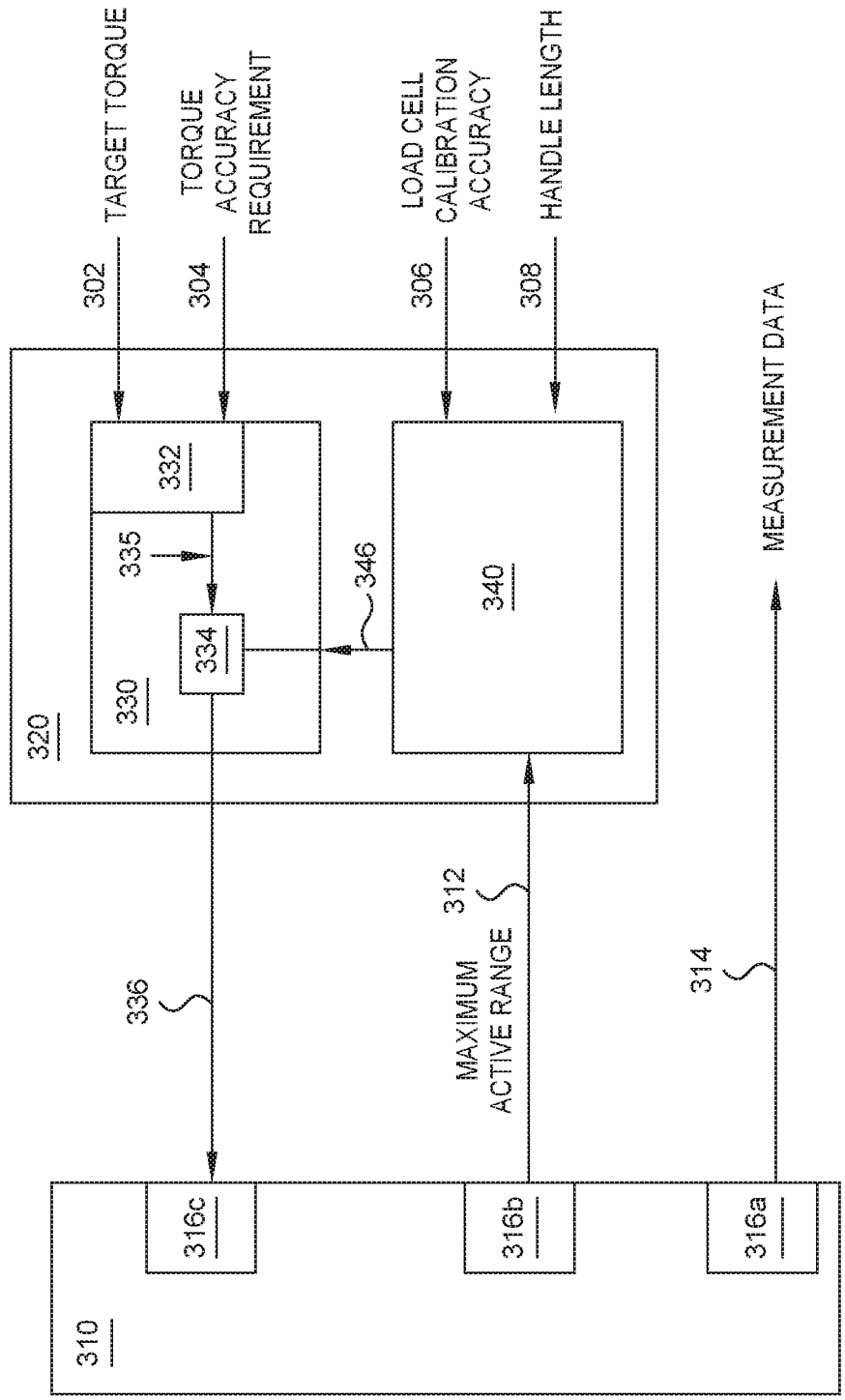
FIG. 2A is a schematic block diagram of a multiple range load cell according to embodiments of the present disclosure.

FIG. 2A is a schematic block diagram of a multiple range load cell system 300 according to embodiments of the present disclosure. The multiple range load cell system 300 may be used with the tubular make up system 200 described above.

The multiple range load cell system 300 may include a load cell body 310 and a controller 320. The load cell body 310 may be a load cell having multiple measurement ranges. The controller 320 is connected to the load cell body 310. The connection between the controller 320 and the load cell body 310 may be wired or wireless. In some embodiments, the controller 320 is integrated to or physically attached to the load cell body 310. In other embodiments, the controller 320 is positioned at a remote location from the load cell body 310 and may communicate wirelessly; for example, the controller 320 may be disposed on or be part of a system controller. The controller 320 may be an integrated circuit device, a computer, a programmable logical controller or other similar devices.

In some embodiments, the load cell body 310 may include a sensing unit configured to make measurements in different ranges. In some embodiments, the load cell body 310 may include two or more sensing units each configured to make measurement in a different range. In some embodiments, the sensing units may be connected in parallel and activated independently. According to embodiments of the present disclosure, each measurement range is calibrated independently and has its own load cell calibration accuracy value. In some embodiments, the load cell calibration accuracy value 308 is provided by the manufacturer of the load cell. Calibration of the load cell body 310 may occur offsite. In other embodiments, the load cell body 310 may be a variable range load cell which is adjustable to function at different measurement ranges.

In some embodiments, the load cell body 310 may have a variety of available measurement ranges and a variety of calibration settings. The load cell body 310 may be configured to measure forces at a variety of measurement ranges. In some embodiments, the load cell body 310 includes interfaces for communicating with another device. In one example, the load cell body 310 may include one or more two-wire, 4 . . . 20 mA serial interface 316a used for transmitting measurement data 314. In some embodiments, the load cell body 310 may include an interface 316b used for transmitting active range information 312. In some embodiments, the load cell body 310 may include an interface 316c used for transmitting selected range information. In some embodiments, the load cell body 310 may include other interfaces for transmitting information, such as identification information, which may include load cell identification, type, calibration data, measurement torque range, etc. In some embodiments, the load cell body 310 includes two or more wires for measurement and two or more wires for transmitting information between the load cell body 310 and the controller or another suitable device. In some embodiments, the load cell body 310 transmits the information in response to a request by the controller.

The range of the measurement of the load cell body 310 may be determined (e.g., looked up) based on datasheets and the values are entered into the load cell body 310. In some embodiments, the measurement ranges are preset in the load cell body 310, and the load cell body 310 is calibrated prior to deployment. In some embodiments, the load cell body 310 receives the selected measurement range information 336 from the controller 320 via the interface 316c. In some embodiments, two or more of the measurement ranges at least partially overlap. In some embodiments, at least two measurement ranges do not overlap.

The controller 320 may include a load cell accuracy calculator 340 configured to calculate the current load cell accuracy according to the active measurement range and other information related to the load cell body 310 and tools being used. In some embodiments, the load cell accuracy calculator 340 is configured to determine load cell accuracy according to the active range information 312 received from the load cell body 310, a tong handle length 308 received from a system controller, and load cell calibration accuracy 308.

FIG. 2B is a load cell accuracy calculator according to one embodiment of the present disclosure. In FIG. 2B, the load cell accuracy calculator 340 includes a multiplier 348. Current accuracy 346 is calculated by multiplying a maximum force of the active range 312, the handle length 308 of the tong being used for making up a tubular, and the load cell calibration accuracy 306 of the active range 312.

Referring back to FIG. 2A, the controller 320 further includes a range switching module 330 configured to determine a measurement range according to a minimum accuracy requirement and the current accuracy. The controller 320 includes a minimum accuracy generator 332 and a comparator 334.

Figure 2C:
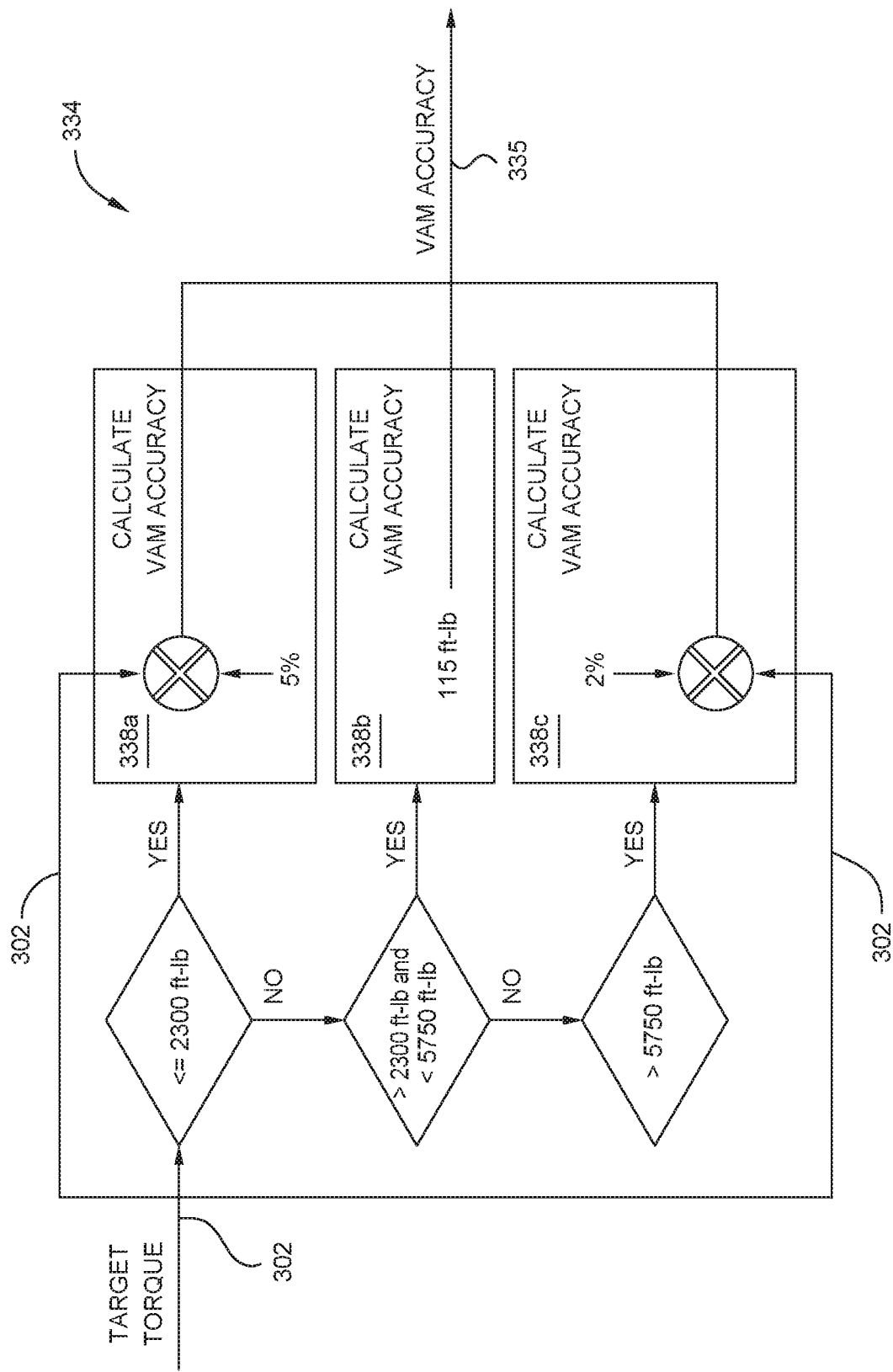
FIG. 2C is a minimum accuracy generator according to one embodiment of the present disclosure.

The minimum accuracy generator 332 is configured to determine required accuracy 335 according to target torque 302 and torque accuracy requirement 304. FIG. 2C is a minimum accuracy generator according to one embodiment of the present disclosure. FIG. 2C demonstrates a process flow for determining the minimum torque accuracy requirement 335 for a tubular according to the target torque 302. Manufacturers of tubulars being made up typically provide a torque measurement accuracy table at different ranges of target torque. In the example of FIG. 2C, the torque accuracy requirement for the target torque below 2300 ft-lb is less than 5% of the target torque, the torque accuracy requirement for the target torque between 2300 ft-lb and 5750 ft-lb is less than 115 ft-lb, and the torque accuracy requirement for the target torque greater than 5750 ft-lb is less than 2% of the target torque. A calculator 338a, 338b, 338c is designated for calculating the required accuracy 335 for each range of the target torque. When the target torque 302, based on the operation being performed, is provided to the minimum accuracy generator 332, one of the calculators 338a, 338b, 338c is selected to calculate the required accuracy 335.

Referring back to FIG. 2A, the required accuracy 335 is fed provided to comparator 334. The comparator 334 also receives the current accuracy 346 from the load cell accuracy calculator 340. The comparator 334 compares the current accuracy 346 and the required accuracy 335 and generates a new measurement range information 336 if the current accuracy 346 is outside the required accuracy 335. The new measurement range information 336 is sent to the load cell body 310 which switch the active range accordingly.

Figure 3:
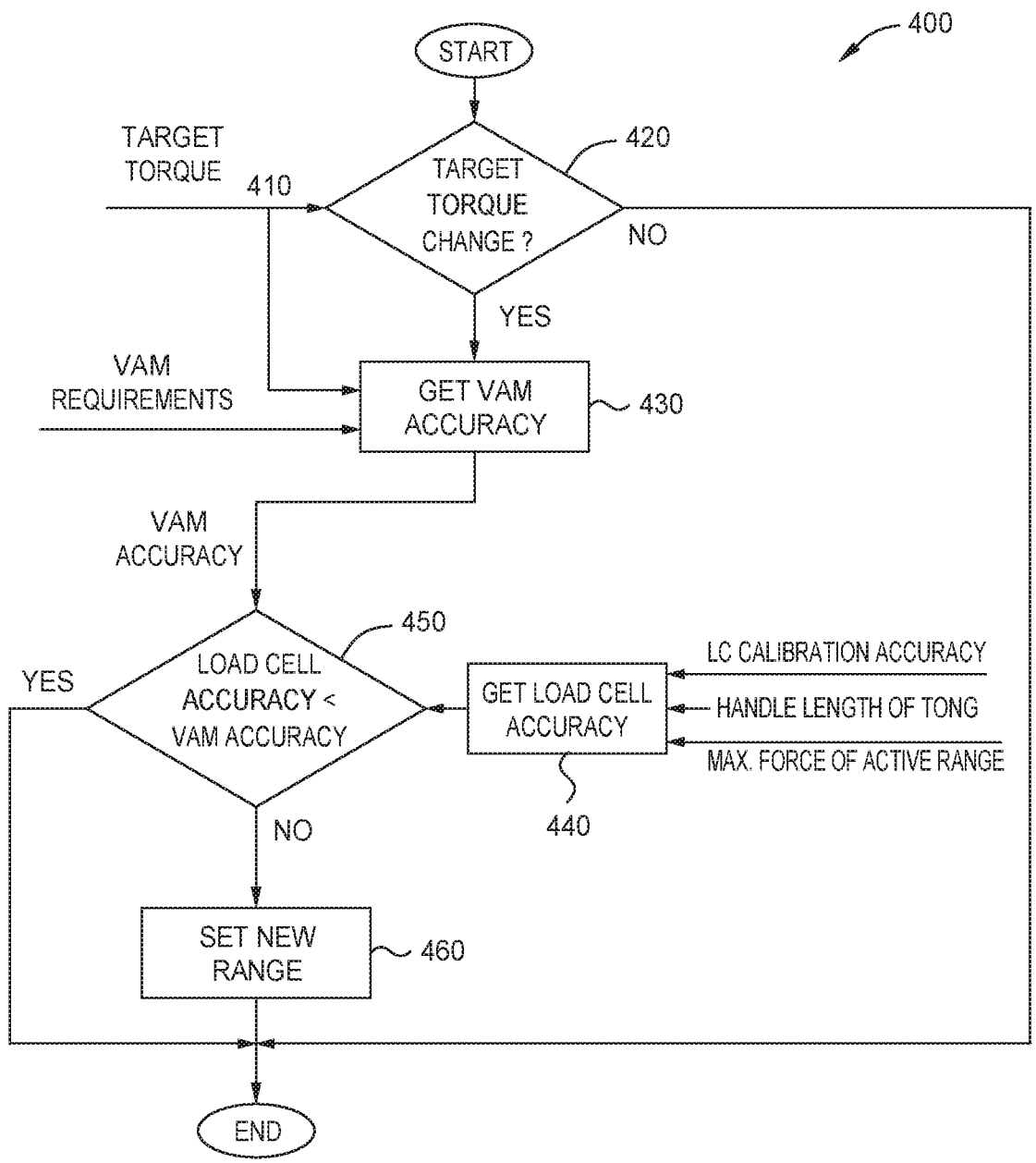
FIG. 3 is a flow chat for a method of operating a multiple range load cell according to embodiments of the present disclosure.

FIG. 3 is a flow chart for a method 400 of operating a multiple range load cell according to embodiments of the present disclosure. The method 400 may be used to operate the multiple range load cell according to the present disclosure to form tubular connections using a tong assembly. For example, a multiple range load cell, such as the load cell 226, 300, may be attached to a tong assembly, such as the assembly 200, to make up tubular connections. The load cell 226, 310 measures torque applied to the tubulars and provides the measurement information to a controller, such as the controller 204. The load cell system? 226, 310 automatically switches active measurement range according to the target torque for the operation to insure that the load cell measurement accuracy is within the minimum required accuracy.

In operation 410, when starting a new tubular makeup process, a target torque for the current operation is provided to the multiple range load cell system to determine whether the target torque has changed from the current setting.

If the target torque has changed, operation 430 is performed to determine the accuracy requirement corresponding to the target torque. Operation 430 may be performed in a minimum accuracy calculator connected to the multiple range load cell, such as the minimum accuracy calculator 332.

In operation 450, current load cell accuracy is calculated according to the active range. Operation 450 may be performed by an accuracy calculator, such as the load cell accuracy calculator 340.

In operation 450, the current load cell accuracy is compared to the minimum accuracy requirement.

If the current load cell accuracy is not within the range of the minimum accuracy requirement, operation 460 is performed to set a new range.

In one embodiment, a load cell assembly includes a load cell body configured to perform measurement in two or more ranges; and a controller connected to the load cell body for data communication, wherein the controller is configured to acquire information of an active range of the load cell body, and send command to the load cell body to switch the active range to another range of the two or more ranges.

In another embodiment, a method includes measuring a torque using a multiple range load cell including a controller connected to a load cell body having multiple ranges, wherein the multiple range load cell is configured to measure the torque in an active range; receiving a change in a target torque; and switching the active range to another range of the multiple ranges of the load cell body upon receiving the change in the target torque using the controller.

In another embodiment, a tubular make up tool includes a tong assembly; a load cell body attached to the tong assembly and configured to measure torque applied by the tong assembly in a selected range of two or more ranges; and a controller connected to the load cell body for data communication, wherein the controller is configured to acquire information of the selected range of the load cell body, and send command to the load cell body to selected another range of the two more ranges.

While the foregoing is directed to embodiments of the present disclosure, other and further embodiments of the disclosure may be devised without departing from the basic scope thereof, and the scope of the invention is determined by the claims that follow.

The invention claimed is:

1. A load cell assembly, comprising:
    a load cell body configured to perform torque measurement in two or more torque ranges; and
    a controller connected to the load cell body for data communication, wherein the controller is configured to acquire information of an active torque range of the load cell body, and send command to the load cell body to switch the active torque range to another torque range of the two or more torque ranges.

2. The load cell assembly of claim 1, wherein the controller comprises:
    a load cell accuracy generator configured to determine a current accuracy according to the information of the active torque range; and a range switching module configured to determine a new torque measurement range according to a minimum accuracy requirement and the current accuracy from the load cell accuracy generator.

3. The load cell assembly of claim 2, wherein the load cell accuracy generator is configured to calculate the current accuracy based on a maximum force of the active torque range, calibration accuracy of the active torque range, and dimensional information of a tool on which the load cell assembly is attached.

4. The load cell assembly of claim 2, wherein the range switching module comprises:
a minimum accuracy generator configured to determine the minimum accuracy requirement according to a target torque.

5. The load cell assembly of claim 4, wherein the range switching module further comprises:
a comparator configured to compare the minimum accuracy requirement and current accuracy.

6. The load cell assembly of claim 1, wherein the load cell body comprises a plurality of interfaces for communicating with the controller.

7. The load cell assembly of claim 6, wherein the load cell body comprises a first interface for transmitting the information of the active torque range to the controller, and a second interface for receiving range setting information from the controller.

8. The load cell assembly of claim 1, wherein the controller is integrated with or attached to the load cell body.

9. The load cell assembly of claim 1, wherein the controller is located at a remote location from the load cell body.

10. A method, comprising:
measuring a torque using a multiple range load cell including a controller connected to a load cell body having multiple ranges, wherein the multiple range load cell is configured to measure the torque in an active range;
receiving a change in a target torque; and
switching the active range to another range of the multiple ranges of the load cell body upon receiving the change in the target torque using the controller.

11. The method of claim 1, wherein switching active range comprises:
transmitting information of active range between the controller and the load cell body.

12. The method of claim 11, wherein switching active range further comprises:
calculating a current accuracy based on the information of active range.

13. The method of claim 12, wherein switching active range further comprises:
calculating a minimum accuracy requirement based on a target torque.

14. The method of claim 13, wherein switching active range further comprises:
sending a command from the controller to the load cell body to switch active range when the current accuracy is outside the minimum accuracy requirement.

15. The method of claim 12, wherein calculating a current accuracy comprises multiplying a maximum force of the active range, a calibration accuracy of the active range, and a dimensional information of a tool on which the load cell body is attached.

16. A tubular make up tool, comprising:
a tong assembly;
a load cell body attached to the tong assembly and configured to measure torque applied by the tong assembly in a selected range of two or more torque ranges; and
a controller connected to the load cell body for data communication, wherein the controller is configured to acquire information of the selected torque range of the load cell body, and send command to the load cell body to select another range of the two more torque ranges.

17. The tubular make up tool of claim 16, wherein the controller comprises:
a load cell accuracy generator configured to determine a current accuracy according to the information of the selected range; and
a range switching module configured to determine a new measurement range according to a minimum accuracy requirement and the current accuracy from the load cell accuracy generator.

18. The tubular make up tool of claim 17, wherein the load cell accuracy generator is configured to calculate the current accuracy based on a maximum force of the active range, a calibration accuracy of the active range, and a dimensional information of a tool on which the load cell assembly is attached.

19. The tubular make up tool of claim 16, wherein the two or more ranges are torque ranges.

20. The tubular make up tool of claim 16, wherein at least two of the two or more ranges at least partially overlap.

* * * * *